March 26, 1935.  J. J. SHIVELY  1,995,689
POWER TRANSMITTING DEVICE
Filed Feb. 1, 1934  3 Sheets-Sheet 1

INVENTOR
John J. Shively.
BY
[signature]
ATTORNEY

March 26, 1935.  J. J. SHIVELY  1,995,689
POWER TRANSMITTING DEVICE
Filed Feb. 1, 1934   3 Sheets-Sheet 2

INVENTOR
John J. Shively.
BY
ATTORNEY

March 26, 1935.  J. J. SHIVELY  1,995,689
POWER TRANSMITTING DEVICE
Filed Feb. 1, 1934   3 Sheets-Sheet 3
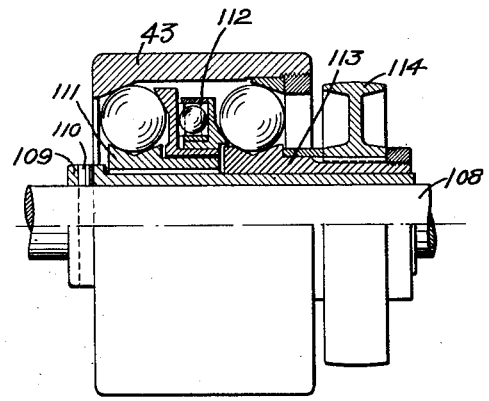
Fig. 8
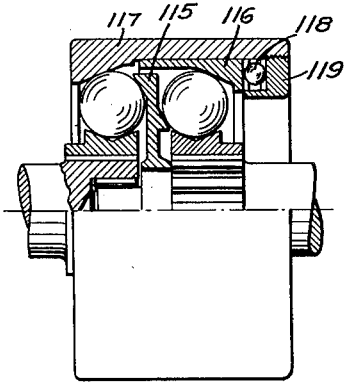
Fig. 9
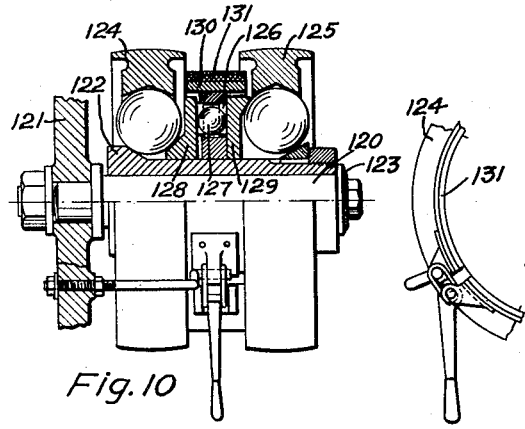
Fig. 10
Fig. 11
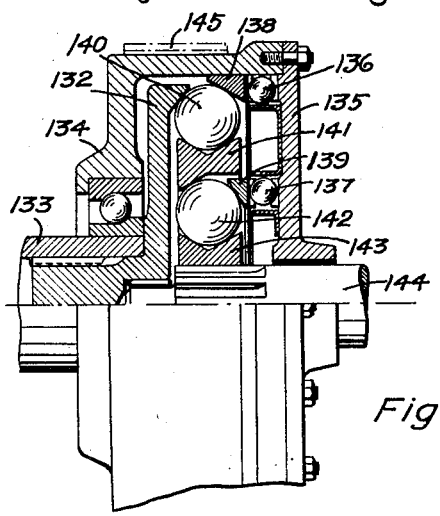
Fig. 12
INVENTOR
John J. Shively
BY
ATTORNEY Patented Mar. 26, 1935

1,995,689

UNITED STATES PATENT OFFICE 1,995,689

POWER TRANSMITTING DEVICE

John J. Shively, Bronxville, N. Y., assignor to Patent Engineering Corporation, a corporation of Delaware Application February 1, 1934, Serial No. 709,320

8 Claims. (Cl. 74—281)

This invention relates to a device for the transmission of motion and power by rolling friction.

If a sphere rotates about its own axis, all points thereon rotate in parallel planes perpendicular to the axis, and at speeds with respect to the axis in proportion to the respective radii of their circles of rotation.

Furthermore, if a sphere is caused to roll without slip on a fixed race, the instantaneous absolute velocity at the point of contact is zero, and the instantaneous absolute forward and backward velocities of all other points on the sphere are in proportion to their distances from the contact point measured at right angles to the axis of rotation of the sphere. If, therefore, a ball be caused to roll without slip on three parallel races, one fixed and the other two movable, the absolute speeds of the two movable races will be those of the ball at the respective points of contact, that is, proportional to the respective contact distances from the fixed race measured at right angles to the ball's axis of rotation.

It further follows that if any one of the three races makes contact with the ball at two points, that is along two parallel paths of the same race, a definite axis of rotation of the ball is thereby determined.

When the ball makes substantially single point contact with each of the three races, the ball tends to pivot on the driven race thereby establishing an axis of rotation perpendicular to the plane of tangency.

Devices are well known in which a speed change is secured by rolling balls between a moving and fixed race and either applying to or taking off a drive from the ball cages or separating members. Such devices are limited in their scope by the fact that the only speed which can be taken off or applied by the cage precessor is that of the center of the balls. Furthermore, such a drive cannot be constructed to operate without sliding friction between the balls and the precessor, except by possible use of additional roller or ball bearing contact members whose complication and bulk renders them impractical.

Other known devices employ friction rollers, revolving pins or axes either stationary or mounted on a precessor by which a drive is applied or taken off.

The present invention makes use of the principles stated in the first paragraph of this specification in order to provide a device effecting speed changes entirely through rolling friction between the balls and races without precessors, fixed or planetary axes or bearings, the balls being unrestrained except by the races themselves.

A further object is to provide a device of the above description which is adapted to lock and drive at direct or one-to-one ratio when the normally fixed member is released or allowed to revolve.

The invention further makes use of the special case of a ball rolling between fixed and driving races and spinning on a driven race, to provide a speed changing device having special characteristics hereinafter set forth.

Fig. 8 is a longitudinal half section of a combined ball bearing and speed reduction device.

Fig. 9 is a longitudinal half section of an alternative structure to Fig. 3.

Fig. 10 is a longitudinal half section of another form of speed changing device.

Fig. 11 is a fragmentary view of the braking means of Fig. 10.

Fig. 12 is a longitudinal half sectional view of a speed changing device having two rows of balls in the same plane.

Figures 1, 2:
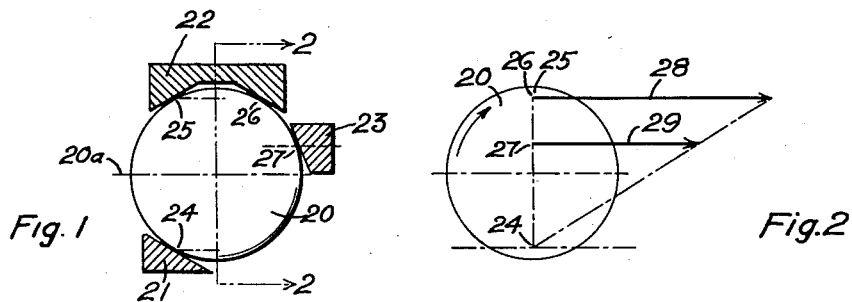
Fig. 1 is a diagrammatic view of a ball in rolling contact with three independent races, one race having two point contact with the ball.
Fig. 2 is a velocity diagram relating to Fig. 1.

Referring to Fig. 1 the numeral 20 denotes a ball in rolling contact with a stationary race member 21, driving race member 22, and a driven race member 23. The fixed race 21 makes contact with ball 20 at point 24, the driving member 22 at points 25 and 26, and the driven race member at point 27.

In Fig. 2 the numeral 28 denotes the velocity of point 25 and 26, and numeral 29 the velocity of point 27.

Figure 3:
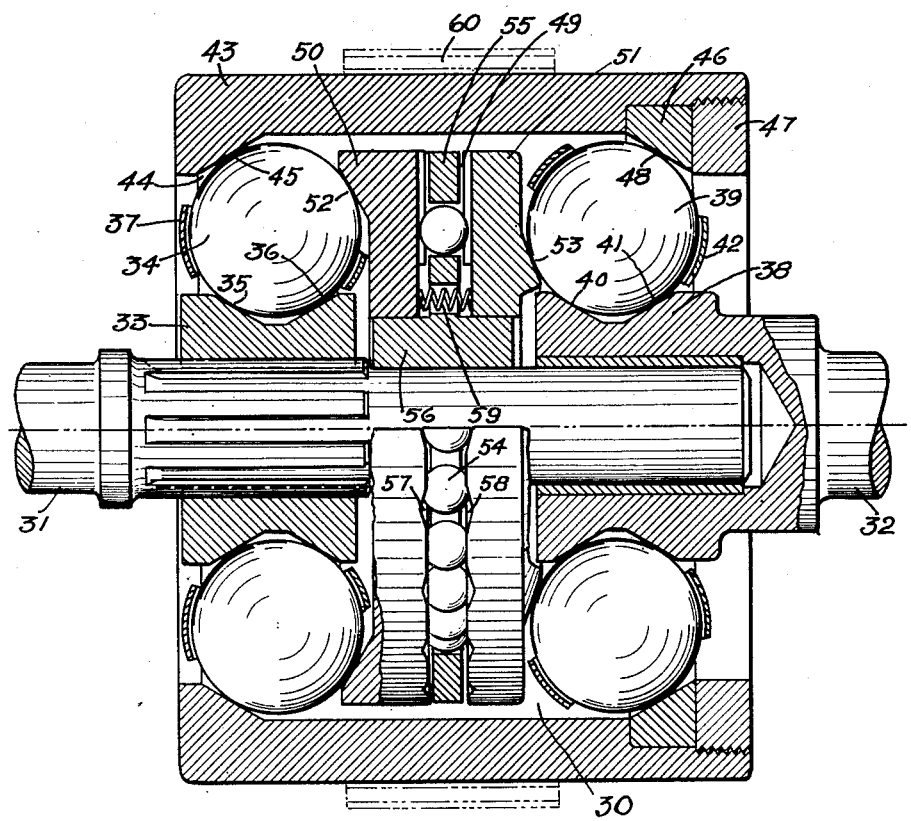
Fig. 3 is a longitudinal section of a speed reducing device using balls and races in the relation generally shown in Fig. 1.

Referring to Fig. 3 the numeral 30 generally denotes a speed changing device having a driving shaft 31 co-axial with and piloted in a driven shaft 32. A driving race member 33, slidably splined to driving shaft 31, supports a set of balls 34 on contact lines 35 and 36. The balls 34 are spaced by a cage member 37 of any suitable construction such as stamped sheet metal.

A driven race member 38 which may be formed integrally with driven shaft 32 or may be fastened thereto, supports a second row of balls 39 on contact lines 40 and 41, said balls 39 being provided with a spacer cage 42.

The numeral 43 denotes an outer sleeve member having an internal taper 44 engaging the balls 34 on race line 45, and an internally tapered ring member 46 secured in 43 by a threaded ring 47 and engaging the balls 39 on race line 48.

The numeral 49 generally denotes an intermediate member comprising race members 50 and 51 engaging balls 34 and 39 respectively on contact lines 52 and 53.

A set of balls 54 loosely retained in a flange 55 formed on a guide hub 56, engage tapered recesses 57 and 58 in the race members 50 and 51 respectively, the members 50 and 51 being rotatable on hub 56 which in turn is rotatable on driving shaft 31. A plurality of springs 59 urge race members 50 and 51 against the balls 34 and 39 respectively. A stationary brake member of any suitable type such as band 60 is adapted to grip and hold the sleeve 43.

Figure 4:
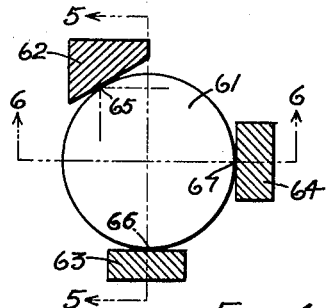
Fig. 4 is a diagrammatic view of a ball in contact with three independent races each having single point contact with the ball.

Referring to Fig. 4, a ball 61 is engaged in rolling relation by a stationary race member 62 and two movable race members 63 and 64 on contact points 65, 66 and 67 respectively.

Figure 5:
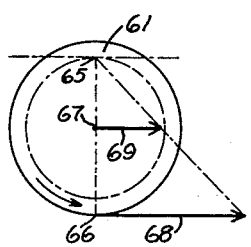
Fig. 5 is a velocity diagram relating to section 5—5 Fig. 4.

In Fig. 5 representing instantaneous velocities when member 63 is the driving 64 the driven member, the numeral 68 denotes the instantaneous velocity of point 66, and 69 the instantaneous velocity of point 67.

Figure 6:
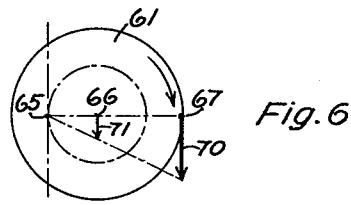
Fig. 6 is a velocity diagram relating to section 6—6 Fig. 4, with the drive application reversed from Fig. 5.

In Fig. 6 representing instantaneous velocities when 64 is the driving member, the numerals 70 and 71 denote the instantaneous velocities of points 66 and 67 respectively.

Figure 7:
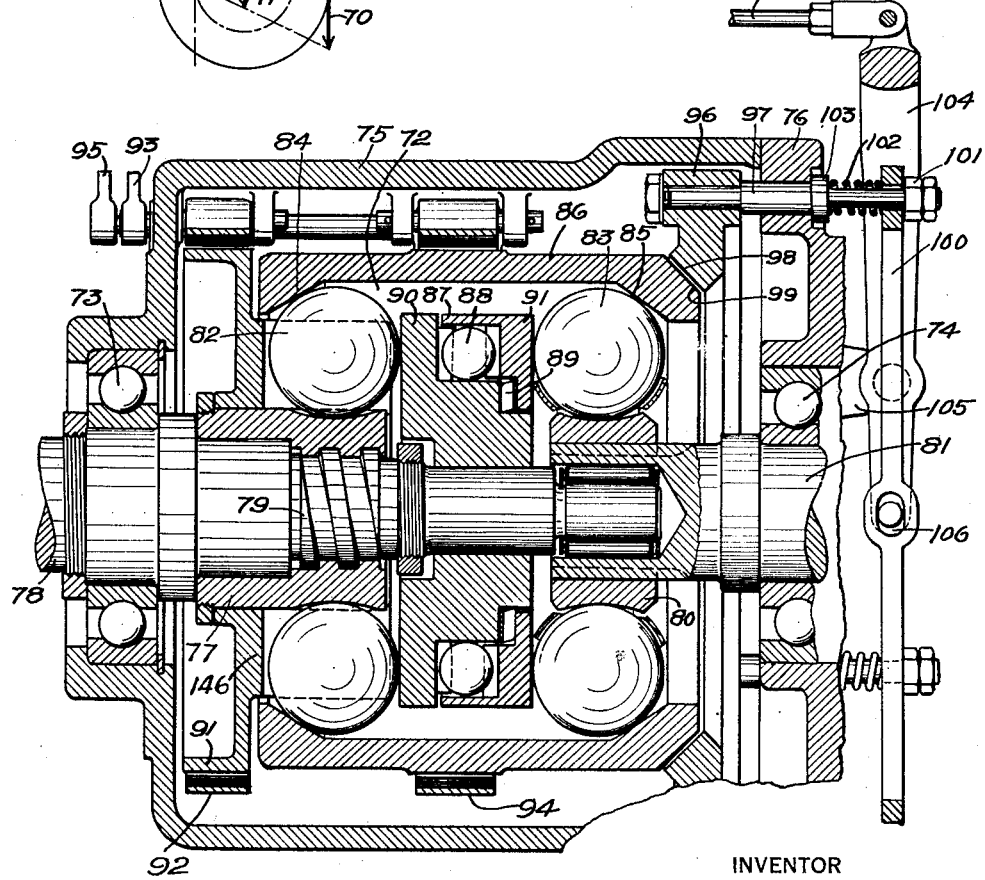
Fig. 7 is a longitudinal view of a speed changing device using balls and races in the general relation shown in Fig. 4.

In Fig. 7 a speed reducing unit 72 is journalled in ball bearings 73 and 74 held in a stationary casing 75 and the end plate 76 thereof respectively. The driving member 77 is revolved by the driving shaft 78 through a worm thread 79, and the driven member 80 is slidably splined to the driven shaft 81. Two sets of driving balls 82 and 83 are disposed around driving and driven members 77 and 80 respectively, engaging tapered races 84 and 85 in an outer sleeve 86. An intermediate member 87 rotatable on shaft 78 and having torque balls 88 and a ribbon spring 89 disposed between race members 90 and 91 presses against driving balls 82 and 83.

The separator cage 146 of balls 82 may be formed rigidly and carry a drum 91 adapted to be gripped by a brake band 92 fastened to the casing 75 and operable by any suitable means such as a lever 93. A similar brake band 94 operable by lever 95 is adapted to grip the sleeve 85.

A ring 96, fastened to a plurality of pins 97 slidable in the end plate 76, has a tapered friction face 98 adapted to engage a mating face 99 on the sleeve 86. An external ring 100 is slidably mounted on pins 97 and is urged against retaining nuts 101 by springs 102 disposed between ring 100 and flanges 103 formed on pins 97. A yoke 104 pivoted on stationary lugs 105 engages slots 106 in ring 100. The numeral 107 denotes a rod connecting yoke 104 with any desired manual or automatic controlling means.

In Fig. 8 the numeral 108 denotes a line-shaft, 109, a sleeve fastened thereon by pin 110, 111 a driving member slidably splined to 109, 112 the intermediate member, 113 a driven member rotatable on sleeve 109, and 114 a pulley splined to driven member 113.

In Fig. 9 the intermediate member is denoted by 115. The numeral 116 denotes a race member rotatable in outer sleeve 117. Torque balls 118 are disposed between member 116 and an end ring 119 fastened to sleeve 117.

In Fig. 10 the numeral 120 denotes a shaft fixed in a stationary support 121, 122 a race sleeve rotatable on 120 and retained thereon by a collar 123, 124 the driving member, 125 the driven member, 126 the intermediate member comprising torque balls 127 disposed between race members 128 and 129, 130 a brake drum splined to race member 129, and 131 a stationary brake band adapted to engage drum 130.

In Fig. 12 the numeral 132 denotes a driving member splined into the end of a driving shaft 133 journalled in a normally stationary casing 134, 135 an end plate fastened to casing 134, 136 and 137 torque wedging balls disposed between plate 135 and race members 138 and 139 respectively, 140 an outer row of driving balls, 141 an intermediate race member, 142 an inner row of driving balls, 143 the driven member slidably splined to driven shaft 144, and 145 a brake band applied to casing 134.

The operation of the device is as follows:

Referring to Fig. 1, pressures sufficient to prevent slip at points 24, 25, 26 and 27 are assumed to be applied, which pressure may be derived in a manner hereinafter described. Driving member 22 being moved in the direction of its race lines, the ball 20 is caused to roll forward on the fixed race 21, carrying race 22 forward at the speed of point 27.

The speed and directing of motion of points 25 and 26 being derived from the same member 22, have a fixed relation and therefore define the direction and axis of rotation of the ball 20, in the present case the axis being the line 20a. All points on ball 20 travel in circles having planes perpendicular to axis 20a, and at instantaneous forward or backward speeds in proportion to their distances from the fixed point 24. The forward velocities of members 22 and 23, as shown by lines 28 and 29, Fig. 2, are in the proportion of distances 25—24 and 27—24. Member 23 is thus driven at speed reduced in the above proportion, the drive being accomplished and the axis of the ball's rotation being defined entirely by rolling action between the ball and races.

While 22 is noted as the driving and 21 the fixed races, it is obvious that any one of the three races may be the driving race and either of the other the fixed race, the operation being the same but the resulting speed changes different in each case.

In Fig. 3 two sets of balls and races are combined to provide a speed changing unit operating on the principles set forth in Figs. 1 and 2.

The brake band 60 being applied, the outer sleeve 43 is held stationary and power is transmitted from driving member 33 through balls 34 to race member 50 of intermediate member 49, which thus becomes a driven member for the first speed change. The drive is transmitted from race member 50 to race member 51 through torque balls 54. Member 51 constitutes the driving member for a second speed change which takes place from 51 through balls 39 to final driven member 38, balls 39 rolling on contact line 48 of the stationary race member 46.

The speed change between driving member 33 and driven member 38 is the product of the above two changes. It should be noted that the second change, that is from intermediate race member 51 to driven member 38 is an overdrive or speed increase, the increase not being as great however as the previous reduction. It should also be noted that due to the fact that speed changes are being transmitted between circular races, the resulting R. P. M. changes are effected by the diameters of the races. Thus the unit illustrates that by suitable combination of ball diameters, contact angles and race diameters, a large range of possible speed change can be made.

If drive be applied through driving shaft 31 and the brake 60 be released, the following action occurs: The sleeve 43 being released, there is no stationary point or fulcrum between driving and driven members, and no drive with a torque change can occur. Therefore, the unit must either idle and transmit no torque or transmit full torque.

If no drive occurs, either sleeve 41 or intermediate member 49, or both, must idle, balls 34 and 39 rolling on them and also on driving member 33 and driven member 38 respectively. Due to the angularity and proportions of the two speed changing elements, the above idling would require sleeve 43 and intermediate member 49 to revolve at two rotative speeds relative to each other at the same time, which is obviously impossible without slip. Since slip is prevented at all times as hereinafter explained, idling cannot occur, and the device locks throughout and revolves as a unit to transmit the drive at one-to-one or direct ratio.

Pressure to prevent slip is furnished by the intermediate or torque wedge member 49 in the following manner: When no torque is being transmitted, the springs 58 press the race members 50 and 51 against balls 34 and 39, which latter are wedged between the tapered outer recess 44 and 46 and the driving member 33 and driven members 38 respectively. As torque is applied it is transmitted between races 50 and 51 through the torque balls 49, which wedge between the inclined faces of recesses 56 and 57. The wedging action applies additional force through members 50 and 51 to the driving balls and races, the forces increasing in proportion to the increase of torque. The angularity of torque wedge surfaces and driving ball races are such that the resultant normal forces between balls and races are at all times sufficient to prevent slip. The driving member 33 being slidably splined to driving shaft 31, "floats" longitudinally to allow for contraction or expansion of the parts under pressure changes, thereby maintaining correct alinement at all times.

In Fig. 4 either member 63 or member 64 may be the driving or driven member, 62 being a fixed race member. When 63 is the driver the ball rotates around an axis through the point 67, rolling forward on stationary race 62 and carrying driven member 64 forward. The instantaneous velocities of points 66 and 67 and therefore the speeds of races 63 and 64 are represented by lines 68 and 69, Fig. 5. When 64 is the driver and 63 the driven member, rotation takes place around an axis through point 66. The ball 61 rolls forward on 62, spinning on 63 and carrying the latter forward, the speeds of 63 and 64 being represented by lines 71 and 70 Fig. 6.

From the foregoing it will be noted that a speed reduction occurs between driver and driven member in either direction, the axis of rotation of the ball changing according to which movable race is made the driving member.

In the embodiment shown in Fig. 7, two sets of balls 82 and 83 are used, as in Fig. 3, but making single point or race line contact with all races. The races of driving member 77 and driven member 80 are made concave to locate the apparatus longitudinally. The radius of concavity is large compared with that of the driving balls, so that the substantially point contact is maintained.

When driving member 77 is revolved, the outer sleeve 86 being held stationary by brake band 94, intermediate member 87 is driven at reduced speed through balls 82 in the manner described in Figs. 4 and 5. A second speed reduction takes place from intermediate member 87 through balls 83 to driven member 80. The driven shaft 81 is thereby driven at speed reduced from that of driving shaft by the product of the two reductions noted.

If the torque application be reversed, so that shaft 81 becomes the driver, two speed reductions take place in the manner described in Figs. 4 and 6. Thus it is evident that either shaft of the unit may be revolved and a drive taken from the other shaft at reduced speed.

If the brake 94 be released, the balls are locked for the same reason explained in Fig. 3, and the device revolves as a unit, effecting a one-to-one drive. The intermediate or torque wedge member functions as previously explained.

In case it is desired to maintain a direct drive in the normal torque direction, assumed to be clockwise from the left, but a reduced drive when torque reversal occurs, the brake band 94 is held disengaged and the ring 96 is moved to the position shown. When torque reverses, the driving member 77 is screwed to the right on worm thread 79, moving with it the entire ball and race unit due to the concavity of the driving and driven races, and bringing friction faces 99 and 98 into engagement, by which means sleeve 85 is stopped and a speed reduction takes place from shaft 81 to shaft 78. As the torque again reverses to normal direction 77 is screwed to the left, 75 is released and the drive again becomes direct.

The springs 102 limit the frictional force between 98 and 99, and their strength may be such as to allow 99 to slip, thus only partially restraining the sleeve 85 and causing a speed change intermediate between direct drive and maximum change. By a pull on the rod 107 the plate 102 may be moved farther to the left, increasing the pressure of springs 102 and altering the over-all speed change until 85 is stopped and maximum change occurs.

When no speed change is desired with drive in either direction, 94 is held released and plate 96 is moved to the right out of the range of movement caused by the worm thread 79.

In case an optional reverse drive is desired, the brake band 92 may be applied to the drum 91, thus holding the cage 146 stationary. The balls 82 now drive the outer sleeve 85 in a reverse direction, spinning on the intermediate member 87 and holding it stationary. The sleeve 85 now drives the driven members 80 through the balls 83, the intermediate member 87 becoming the stationary race member and the balls 83 spinning on the driven member 80 as previously described.

One advantage of the structures shown in Figs. 3 and 7 wherein the torque wedge is interposed between two sets of driving balls, is that all thrust forces are confined within the unit itself, none being transmitted through the shafts to outside structures. The result may also be accomplished by placing the torque wedge in the outer sleeve as illustrated in Fig. 9. However, the driving means set forth in this invention is not confined to such structures, as it may be desirable for some purposes to use outside thrust construction.

A further advantage of the structures shown in Figs. 3 and 6 is the fact that when the outer sleeve is released the unit locks throughout without the use of any clutching means except the relative action of the balls and races, there being no interruption of power flow during changes of speed ratio either up or down.

Fig. 8 shows an advantageous use of the unit as a combined ball shaft bearing and reducing gear. The internal or driving thrust being taken in both directions by the outer sleeve 43, no thrust occurs through the shaft to which the driving member 109 may be fastened in any suitable manner, such as the pin 110. The outer or fixed sleeve 43 may be mounted in any desired support such as a shaft hanger (not shown) and a drive taken off the pulley 114.

In Fig. 9 the thrust necessary to effect drive without slip is produced by the torque wedging balls 118 and members 116 and 119 mounted in the outer sleeve 117, this structure being an alternative to that shown in Fig. 3.

Fig. 10 shows a speed changing device in which the drive is applied and taken off at outer races 124 and 125. The thrust is taken by the sleeve 122 surrounding the shaft or pin 123, and the brake 131 may be applied to the intermediate or torque-wedging member 126. This unit operates in substantially the same manner as that shown in Fig. 3, and no further explanation is deemed necessary.

In Fig. 12 the drive takes place between driving and driven members in the manner already described except that the sets of balls being arranged concentrically, the thrust is produced by two sets of torque wedging elements 136 and 137 on the end plate 135. The proportions of this structure are such that the final drive takes place in a reverse direction at a very high ratio. If casing 134 is released, the device locks and revolves as a unit as already described.

While the V or double line contact races are shown in various figures as having the center line of the V perpendicular to the shafts, this need not be the case, as these V races may be constructed at other angles to give different axes of rotation of the balls.

Also it will be noted that the magnitudes of the pressures between balls and races perpendicular to the latter are functions not only of the torque and the angularity of the torque wedge surfaces, but also of the angularity of the races. Thus the angles of the latter may be so chosen as to give an additional wedging effect, thereby lessening the strain required of the torque balls but applying sufficient pressures to the driving balls to prevent slip. All driving thrusts are taken by rigid members and confined within the units themselves and essential parts are self alining, which makes the device conveniently applicable to a wide variety of uses.

While in this invention slip is prevented and action is positive at all times, changes from direct to reduced drive ratio and changes in torque occur without "grab" or shock, due to the cushioning action set up in overcoming the slight resiliency of a train of coacting members in pure rolling contact.

What is claimed is:

1. In a power transmitting device in combination, a driving race member, a driven race member, a plurality of balls in rolling contact with said driving race member, a plurality of balls in rolling contact with said driven race member, an intermediate race member in rolling contact with all of said balls an outer race member in rolling engagement with all of said balls, and means for restraining the rotative motion of said outer race member.

2. In a power transmitting device, in combination, a driving race member, a driven race member, a plurality of balls in rolling contact with said driving race member, a plurality of balls in rolling contact with said driven race member, an intermediate race member in rolling contact with said balls, an outer race member in rolling engagement with said balls, means for restraining the rotative motion of said outer race member, and means comprised in said intermediate member to apply pressure to said balls and races, said pressure varying in response to changes in torque transmitted through said intermediate member.

3. In a power transmitting device, in combination, a driving race member, a driven race member, a plurality of balls engaging said driving race member, a plurality of balls engaging said driven race member, a thrust-producing intermediate race member in engagement with said balls, a thrust absorbing race member in engagement with said balls, means to restrain said thrust absorbing race member from rotation, and means to release said restraining means.

4. In a power transmitting device, in combination, an outer sleeve having internal opposed raceways, braking means operative to engage said sleeve, two sets of driving balls engaging said internal raceways, two ring members disposed between said sets of driving balls in rolling engagement with the same and having a plurality of wedging surfaces, a plurality of balls engaging said wedging surfaces, a driving race member engaging one of said sets of driving balls, and a driven race member engaging said other set of driving balls.

5. In a power transmitting device, a rotary driven member, a rotary driving member coaxial therewith, planetary rolling members in frictional rolling engagement with said driving member, other planetary rolling members in frictional rolling engagement with said driven member, an intermediate race member and a second race member in frictional rolling engagement with all said rolling members, said first and said second rolling members engaging said intermediate race member and said second race member on race circles of different diameters whereby said rolling members normally tend to revolve said intermediate member and said second race member at two different relative speeds.

6. In a power transmitting device, a rotary driven member, a rotary driving member coaxial therewith, planetary rolling members in frictional rolling engagement with said driving member, other planetary rolling members in frictional rolling engagement with said driven member, an intermediate race member and a second race member in frictional rolling engagement with all said rolling members, said first and said second rolling members engaging said intermediate race member and said second race member on race circles of different diameters whereby said rolling members normally tend to revolve said intermediate member and said second race member at two different relative speeds, and means operable to restrain said second race member from rotation.

7. In a power transmitting device, in combination, a driving race member, a normally fixed race member, a rotatable intermediate race member, a driven member, balls rollable on said driving race member, on said fixed race member and on said intermediate race member to transmit power from said driving to said intermediate race member, balls normally rollable on said intermediate race member, on said fixed race member and on said driven race member to transmit power from said intermediate to said driven race member, means to rotarily release said normally fixed member, and means to prevent slip between said balls and race members, said last named means being adapted to set up resistance to relative rotation between said balls and members, whereby said device may be caused to revolve as a unit when said fixed member is released.

8. In a power transmitting device, in combination, a driving race member, a driven race member, a plurality of balls engaging said driving race member, a plurality of balls engaging said driven race member, a thrust-producing intermediate race member in engagement with balls and positioned thereby, a thrust absorbing race member in engagement with said balls, and positioned thereby, means to restrain said thrust absorbing race member from rotation, and means to release said restraining means.

JOHN J. SHIVELY.